United States Patent
Méndez-Ferreira et al.

(10) Patent No.: US 7,066,988 B2
(45) Date of Patent: Jun. 27, 2006

(54) SEGMENTED PLATE FOR ASSEMBLY WITHIN A CONFINED AREA HAVING LIMITED ACCESS

(75) Inventors: Victor Omark Méndez-Ferreira, Boulder, CO (US); Kenneth Morse, Broomfield, CO (US)

(73) Assignee: The Regents of the University of Colorado, Boulder, CO (US)

( * ) Notice: Subject to any disclaimer, the term of this patent is extended or adjusted under 35 U.S.C. 154(b) by 222 days.

(21) Appl. No.: 10/643,358

(22) Filed: Aug. 19, 2003

(65) Prior Publication Data
US 2005/0040606 A1    Feb. 24, 2005

(51) Int. Cl.
*B01D 47/14* (2006.01)
*B01D 19/00* (2006.01)

(52) U.S. Cl. .......................... 96/202; 95/244; 95/263; 261/114.5

(58) Field of Classification Search .......... 277/606, 277/628; 95/244, 213, 260, 263, 264, 265; 96/220, 189, 190, 197, 202; 261/113, 114.1, 261/114.5; 122/442, 488, 489
See application file for complete search history.

(56) References Cited

U.S. PATENT DOCUMENTS

| | | | | |
|---|---|---|---|---|
| 1,622,283 A * | 3/1927 | Jones | .................. | 96/205 |
| 2,071,134 A * | 2/1937 | McDermet | .................. | 95/245 |
| 2,611,457 A * | 9/1952 | Glitsch | .................. | 261/114.1 |
| 2,836,406 A * | 5/1958 | Nutter | .................. | 261/114.4 |
| 3,008,553 A * | 11/1961 | Glitsch et al. | .................. | 52/510 |
| 3,039,751 A * | 6/1962 | Roeland | .................. | 261/114.1 |
| 3,053,520 A * | 9/1962 | Streuber | .................. | 261/114.5 |
| 3,233,708 A * | 2/1966 | Glitsch | .................. | 52/483.1 |
| 3,742,119 A * | 6/1973 | Newman | .................. | 174/65 R |
| 4,120,919 A * | 10/1978 | McClain | .................. | 261/114.5 |
| 4,133,852 A * | 1/1979 | DiNicolantonio et al. | .................. | 261/114.5 |
| 4,966,374 A * | 10/1990 | Oikawa et al. | .................. | 277/606 |
| 5,118,449 A * | 6/1992 | Wade et al. | .................. | 261/114.1 |
| 5,454,989 A * | 10/1995 | Nutter | .................. | 261/114.1 |
| 5,788,895 A * | 8/1998 | Altinger et al. | .................. | 261/114.5 |
| 6,068,244 A * | 5/2000 | Burton et al. | .................. | 261/114.4 |
| 6,113,079 A * | 9/2000 | Urbanski et al. | .................. | 261/114.5 |
| 6,422,539 B1 * | 7/2002 | Burton et al. | .................. | 261/114.4 |

(Continued)

OTHER PUBLICATIONS

Council of Industrial Boiler Owners (CIBO). CIBO Energy Efficiency Handbook, Chapter 2: Water Treatment, pp. 1-11, Nov. 1997.

(Continued)

*Primary Examiner*—Duane Smith
(74) *Attorney, Agent, or Firm*—Macheledt Bales & Heidmiller LLP

(57) ABSTRACT

A segmented plate adapted for assembly within a confined area or volume, and a method of assembly of the segmented plate. The plate, as assembled, has an exterior perimeter that includes exterior edge-boundaries of a plurality of generally rigid plate-sections, each of the plate-sections are sized smaller than the access to permit passage therethrough. Extending at least partially along adjacent boundaries of plate-sections that have been adjacently arranged, is a self-lock seam, or interposed therebetween is a flexible barrier. The self-lock seam may have a variety of configurations. An aperture or opening having an inner perimeter may be included. The inner perimeter of the aperture/opening may be of a variety of shapes. The confined area may consist of a chamber of a deaerator tank or other volume to which access is limited. The flexible barrier may be made of a material having resiliency.

22 Claims, 8 Drawing Sheets

U.S. PATENT DOCUMENTS

| | | | |
|---|---|---|---|
| 6,592,106 B1 * | 7/2003 | Eaton, Jr. | 261/114.3 |
| 6,623,303 B1 * | 9/2003 | Syed et al. | 439/610 |
| 6,755,943 B1 * | 6/2004 | Mizutani et al. | 203/99 |
| 2003/0127755 A1 * | 7/2003 | Eaton, Jr. | 261/114.5 |

OTHER PUBLICATIONS

GORE® Sealant Technologies Utilities and Power Generation: Gasketing Products, Packing Products, online, 5 sheets retrieved and printed on Aug. 2, 2003, retrieved from www.gore.com/sealants/english/industry_utilities.html . By way of background only.

TFCO Joint Sealant: Joint Sealant Stem Packing Description, online, one page retrieved and printed on Aug. 3, 2003, retrieved from www.tfcoinc.com/JointSealant/JointSpecifications.htm.

Sealants and Coatings.com Product Information—Joint Sealants, online, 3 sheets retrieved and printed on Aug. 4, 2003, retrieved from www.sealantsandcoatings.com/products/prodinfo-listing.cfm? By way of background only.

Four pages depicting isometrics of deaerator tank designs, retrieved and printed on Aug. 4, 2003, retrieved from www.sterlingdeaerator.com/Models/St_Models . . . By way of background reference only.

* cited by examiner

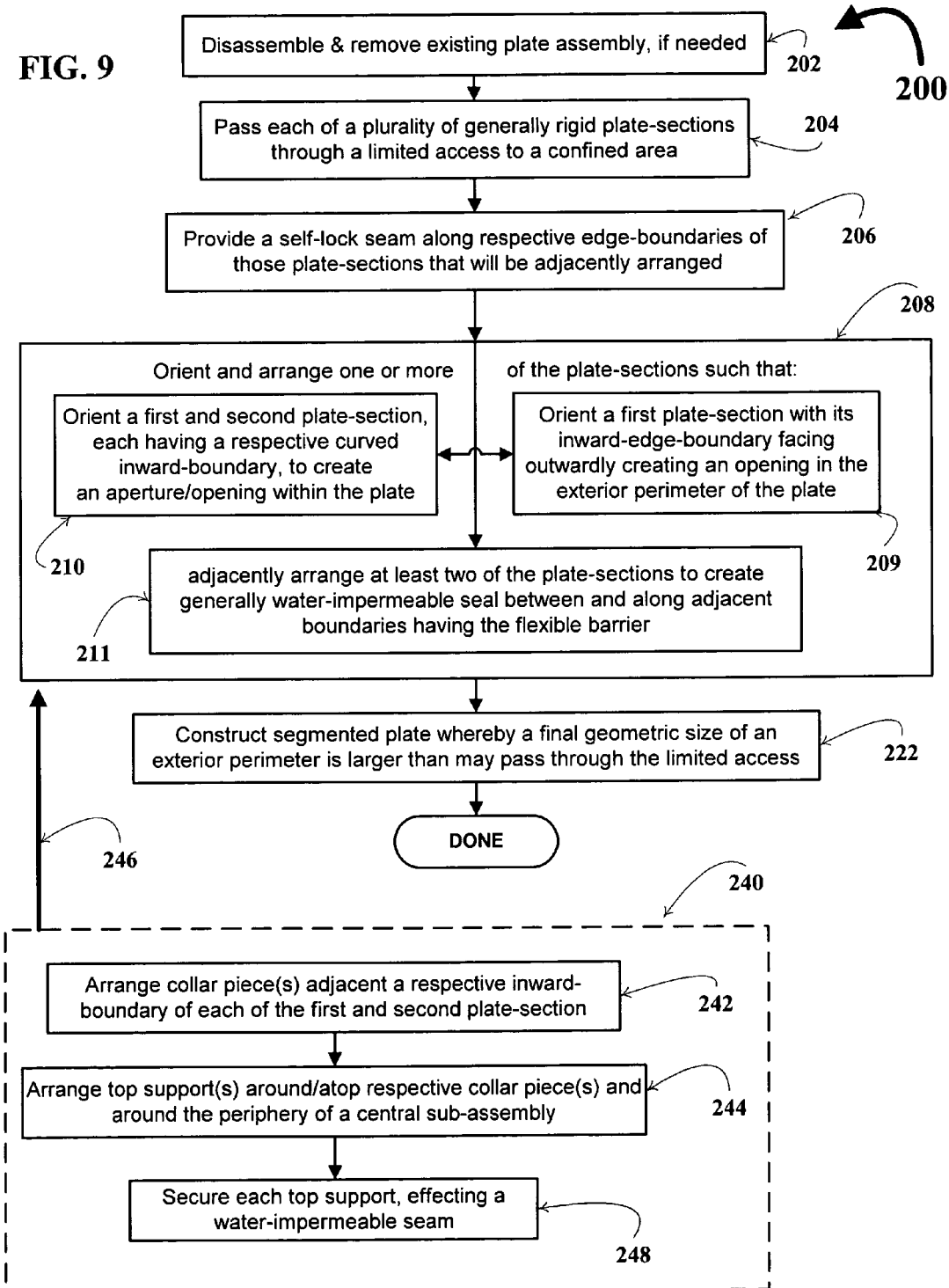

SEGMENTED PLATE FOR ASSEMBLY WITHIN A CONFINED AREA HAVING LIMITED ACCESS

BACKGROUND OF THE INVENTION

1. Field of the Invention

In general, the present invention relates to original equipment manufacturer (OEM) components/parts/assemblies, new and replacement, which are located or built within a volume or chamber where access is limited; such as is the case with deaerator tanks within which plate assemblies are initially built, and at some point in time typically need replacing due to caustic conditions, extreme temperature fluctuations and low pressure(s) to which the plate assembly is exposed.

2. Background of the Invention

More-particularly, applicants' invention is directed to a unique segmented plate and associated plate assembly technique, adapted for use where access is limited to an area/chamber within which the plate is to be secured and employed for use in connection with an enclosure. While focus of the embodiments depicted and described herein is within the context of power plant boiler systems, and more-particularly, this discussion is directed towards use of applicants' segmented plate in deaerator tanks where water treatment takes place to mechanically reduce dissolved oxygen levels from the water before it flows into the boiler system, the plate assembly of the invention may be used in a wide variety of contexts in connection with a equipment having areas/chambers to which access is limited.

As is well known, deaerator tanks have chambers with limited access: the tray enclosure within which the deaerating process takes place typically has a nozzle-vent body assembly through which steam passes and non-condensable gases (e.g., oxygen, carbon dioxide) may pass. In many cases, the geometric size of internal assemblies make it difficult, if not impossible, to build or repair a damaged assembly having an exterior perimeter larger than will fit through the limited access. The segmented plate of the invention provides a unique solution for those responsible for regular power plant deaerator maintenance. Applicants' unique segmented plate design may be used as a replacement for unitary plates currently built into new OEM deaerator tanks around a nozzle-vent body assembly of the tray enclosure, as well as initially installed by an OEM when a new tank product is manufactured. Use of the segmented plate of the invention makes the disassembly and removal of a cracked, fractured, or otherwise damaged tray box's plate, less difficult. Again, and as one will appreciate, the segmented plate and associated plate assembly technique of the invention may be employed in a variety of other contexts where access to an area/chamber within which the plate is to operate, is limited.

It is preferable to keep maintenance downtime associated with tearing-down and rebuilding sub-assemblies of any system to a minimum; this is typically true, whether or not the reason for requiring a repair/rebuild is critical to overall system performance and operation. In the case of power plants, taking a plant 'off-line', or shutting down a major component of the plant for repair, can become very costly. Operating a power plant at less than optimal efficiency can likewise be very costly. One widely used treatment of water in power plants, known as deaerating, is done to remove oxygen from the water flowing into and through the boiler. The removal of oxygen using a deaerator assembly is important, as dissolved oxygen that remains in boiler water interacts with boiler component surfaces. Feedwater with dissolved oxygen leads to carbon doioxide dissolved in water. This lowers the feedwater pH levels and produces corrosive carbonic acid. Typically, a deaerator tank encloses some type of deaerating assembly; the deaerating assembly may be a tray type assembly enclosed to carry out the process of deaeration. Currently, as depicted schematically in FIG. 1 hereof, certain deaerator unit designs incorporate a unitary stainless steel plate bolted to the tray enclosure; this unitary rectangular plate 10 acts as a support for a centrally located nozzle body-vent assembly 14 through which steam is passed and unwanted/excess oxygen gas is vented to carry out deaeration.

When a unitary plate assembly such as that shown in FIG. 1 at 10 in operation secured to a tray enclosure within a deaerator tank 20 to which access 22 is limited, cracks or is otherwise damaged due to the caustic conditions to which the plate is exposed under normal, continuous use, unless the tank 20 can be disassembled (typically an onerous job) to provide more access, the damaged plate can only be replaced after it has been destroyed—for example, by using a torch or other metal cutting tool—and removed, piece-by-piece. Where a deaerator tank 20 is cumbersome to disassemble, or if the tank has no mechanism for disassembly except to torch (or otherwise) open a larger access so that replacement of a damaged plate may be made with another unitary plate, replacement of the new unitary plate may take an extraordinary amount of downtime, effort, and expense. Applicants have developed a unique segmented plate structure and associated assembly technique that attends to this problem in the context of deaerator tank fabrication and maintenance, as well as provides further alternatives to assembling plate structures in a host of other environments.

GENERAL BACKGROUND DISCUSSION, PROVIDED BY WAY OF REFERENCE ONLY

I. Oxygen Attack to Power Plant Assemblies

Dissolved oxygen interacts with boiler component surfaces, forming "pits" on the metal surface. These pits may eventually grow large enough to penetrate the metal, forcing a boiler shutdown. Oxygen presents in boiler feedwater becomes very aggressive when heated, causing corrosive damage to preheaters and economizers. Oxygen that enters the boiler, whether dissolved in water or as oxygen gas, may also cause further damage to steam drums, mud drums, boiler tubes and headers. Damage can also occur to condensers and condensate piping from oxygen still present in the steam.

II. Boiler water treatment: Oxygen Removal with a Deaerator

Controlling the oxygen content in the feedwater may be done through deaeration and chemical treatment. The boiler water treatment that involves the removal of dissolved oxygen in the water employs a deaerator (sometimes called a deaerating heater). Since the solubility of oxygen in water decreases as the water temperature rises, oxygen gas is removed by spraying the untreated boiler water onto trays located within a deaerator enclosure, where it makes direct contact with steam rising through the tray. The steam heats the water while stripping the oxygen. Proper functioning of the deaerator requires that both oxygen and nitrogen gases be vented away from the water being treated. One goal is that the deaerated water should have an oxygen concentration of less than 15 ppb (ug/l). As mentioned, deaerators in steam generating systems, located upstream of heaters and the boiler, use steam to strip oxygen from the feedwater. A properly designed and maintained deaerator can effectively remove nearly all dissolved oxygen, $O_2$, from the feedwater, target is <15 ug/lppb (parts per billion). Final traces of oxygen can be removed from the feedwater with an oxygen scavenger. Deaerators are found in a multitude of types and combination of power plants, power/water cogeneration plants, that incorporate a steam generator, turbine(s), distillers, one or more deaerators, feed water heaters, and so on.

SUMMARY OF THE INVENTION

It is a primary object of this invention to provide an assembly technique and associated segmented plate adapted for assembly within a confined area or volume having a limited access thereto. The unique segmented plate and assembly technique characterized, disclosed and supported herein, include a plurality of generally rigid plate-sections, made of a wide variety of materials, assembled with a unique self-lock seam or a flexible barrier interposed between and along adjacent boundaries of the plate-sections. The self-lock seam provides a mechanical interlocking of adjacent edge-boundaries, taking advantage of the geometric expansion of the plate-section material, upon heating, to provide a seam therebetween. While, if used alone, the flexible barrier does not provide the same strength as the self-lock seam, it affords an alternative. Any of a number of configurations for either may be employed, as contemplated herein. The unique segmentation features of the invention permit an assembled plate to better accommodate the expansion and contracting associated with temperature and/or pressure fluctuations, and other stresses, to which the plate is exposed—decreasing opportunity for cracking, fracture, and other failure(s) within a plate in operation—thus, aiding in prolonging useful life of a plate. Furthermore, the unique nature of applicants' segmented plate design facilitates an assembly technique that can become a routine procedure rather than onerous task, by aiding in tear-down and replacement of worn, cracked, or otherwise damaged plates during maintenance.

As one will appreciate, certain of the several unique features, and the further unique combinations of features, as supported and contemplated hereby may provide a variety of advantages including: versatility in application (e.g., within power plant assemblies, heavy equipment and machinery, and so on); providing additional useful functionalities and maintenance solutions; reduction in downtime; flexibility and efficiency in plant operation; permitting on-site maintenance; and so on. These and other advantages of individual features, and combinations of features, will be appreciated by perusing the instant technical discussion, including the drawings, claims, and abstract, in light of drawbacks to any existing technology that have been identified, or may be uncovered.

Once again, the invention includes a segmented plate adapted for assembly within a confined area or volume having limited access thereto, and a method of assembly, that incorporate many patentably distinguishing features, as described and supported herein. The plate, as assembled, has an exterior perimeter that includes exterior edge-boundaries of a plurality of generally rigid plate-sections, each of the plate-sections are sized smaller than the access to permit passage therethrough for the assembly. Extending at least partially along adjacent boundaries of plate-sections that have been adjacently arranged, is a self-lock seam, and alternatively, a flexible barrier of sufficient strength. An aperture or opening (e.g. 56, 116 or as defined by 131*i*) having an inner perimeter may be included so that the segmented plate may be assembled around an additional piece, sub-assembly or component that, also, is intended to operation within the confined area/volume. The flexible barrier may also be interposed between (1) the interior perimeter and any adjacent piece, such as a collar piece and/or 'top' supports, if used, and the periphery of a sub-assembly, and/or (2) the exterior perimeter and a tray enclosure/box to which an assembled plate is secured, to provide a water-impermeable seal. The inner perimeter of the aperture, may be of a variety of shapes (including having a curvature) and may be comprised of one or more inward-boundary of a first and second of the plate-sections. Adjacent boundaries may include an edge-boundary of a third plate-section adjacent a first edge-boundary of each of a first and second plate-section, and a fourth edge-boundary of a fourth plate-section adjacent a second edge-boundary of each of the first and second plate-sections.

The confined area may consist of a chamber of a deaerator tank or other volume to which access is limited. Due to extreme conditions under which the plate may operate, the generally rigid plate-sections will likely expand and contract upon exposure to the range of temperatures to which the confined area will be exposed; such materials for the plate-sections include a metal, an alloy (such as stainless steel), a ceramic, and so on. The unique self-lock seam preferably is configured to utilize material expansion to its benefit, rather than have it cause material cracking and failure within a plate: When the temperature and/or pressure rises within the confined area, causing plate-sections of an assembled plate of the invention and respective edge-boundaries to expand or shift, a seam is supported along the material edge in a 'self-lock' manner. The flexible barrier preferably is made of a material having resiliency and adapted to produce a generally water-impermeable seal, selected from the group consisting of a gasket tape, a joint sealant, a plastic adhesive, a caulking compound, weather stripping, and a high temperature sealant. Further, the barrier material preferably also resilient to thermal fluctuations to which the segmented plate will be exposed in operation; selection of a thermally resistant material provides longevity to the seal such that it will not degrade to the point it is no longer effective. A wide variety of resilient barrier materials are currently available.

As one will appreciate, there are many further distinguishing features of the segmented plate and assembly technique of the invention. First and second collar pieces may be arranged, in water-impermeable fashion, adjacent the first and second inward-boundaries—which may be curved in full or in part. These first and second collar pieces may be further arranged around a periphery of a central sub-assembly, such as that having a spray nozzle and/or a vent passage therethrough. First and second 'top' supports (which may be arranged underneath) may also be arranged around the periphery of the sub-assembly. Furthermore, to strengthen the seal around the periphery of a sub-assembly, such as a nozzle body sub-assembly, any combination of the following may be sandwiched between a collar piece and a respective 'top' support (which, depending upon frame of reference, may be 'beneath/under' a respective collar piece): a portion of the third edge-boundary, a portion of each adjacent first edge-boundary of the first and second plate-sections, a portion of either or both a first and second curved inward-boundary, and so on.

As is will become apparent, depending upon design of a tray enclosure, box, or other component(s) within the confined area (such as a deaerator tank) alternatively, instead of being centrally located within the segmented plate, the aperture can comprise an opening in the plate's exterior perimeter: For example, a first plate-section may be oriented so that its edge-boundary not only makes up part of the plate's exterior perimeter, but also is part of the inner perimeter of the aperture-opening.

In another characterization, the invention includes a segmented plate adapted for assembly within a chamber of a deaerator tank having a limited access; when assembled to enclose a tray assembly, the plate has an exterior perimeter, a plurality of generally rigid plate-sections, and extending at least partially along adjacent boundaries of plate-sections that have been adjacently arranged, is a self-lock seam or a flexible barrier. Preferably, each of said plate-sections is sized smaller than the access to permit passage therethrough. The segmented plate, as assembled and secured to enclose a deaerating tray assembly, may have additional, or a combination of, the further distinguishing features identified above. The exterior perimeter of the plate is likely to be of a final geometric size larger than can pass through the limited access, and may be fabricated by suitable means into any of a number of shapes such as an oval, a circle, a polygon, and an irregular shape. An aperture added to accommodate a nozzle body/vent sub-assembly, whether centrally located or off-centered, will have an inner perimeter machined or otherwise suitably fabricated into a shape that will coincide with a periphery of the nozzle body sub-assembly, whether oval, circular, polygonal, or an irregular shape. Once again, first and second collar pieces may be arranged around a periphery of the sub-assembly. First and second 'top' supports may also be arranged atop, or beneath, the first and second collar pieces—and likewise arranged around that periphery. The size and shape of the first and second collar pieces are preferably selected to match that of the sub-assembly periphery so that the collar pieces may be arranged adjacent the periphery to create a seam substantially impermeable to water (as a liquid or in the form of steam) under pressure. Flexible barrier material may be added to provide additional sealing capacity between the segmented plate exterior perimeter and a tray enclosure, and around the sub-assembly periphery and between the collar pieces, top supports, and/or plate-section edge boundaries. A sufficient fastening of these pieces by suitable mechanical means (welding, bolts, clips, nails, rivets, and so on) is employed to produce a seam around the sub-assembly, whether flexible barrier material is used.

Another characterization of the invention, as supported herein, focuses on a process for assembling a segmented plate within a confined area having a limited access. Steps include: passing each of a plurality of generally rigid plate-sections through the limited access; adjacently arranging at least two of the plate-sections, interlocking a U-shaped edge of said two plate-sections generally along adjacent boundaries of the plate-sections; and constructing the segmented plate whereby a final geometric size of an exterior perimeter thereof is larger than may pass through the limited access. Further distinguishable method features, associated with those set forth above in connection with the segmented plate of the invention, include the following: arranging a third edge-boundary of a third of said plate-sections adjacent a first edge-boundary of each of a first and second of the plate-sections; arranging a fourth edge-boundary of a fourth of the plate-sections adjacent a second edge-boundary of each of the first and second plate-sections; arranging one or more collar pieces in water-impermeable fashion, adjacent a respective (first and second) inward-boundary of each of the first and second plate-sections; arranging one or more top supports around the periphery of a central or off-centered sub-assembly and around the collar pieces; securing the top support(s), effecting a water-impermeable seam; and sandwiching, between a first collar piece and first support, one or more of the following: a portion of the third edge-boundary, a portion of each of the adjacent first edge-boundaries of the first and second plate-sections, a portion of the first curved inward-boundary, and a portion of the second curved inward-boundary. The assembled sectioned plate may, then, be secured in a manner to enclose a tray assembly adapted for use in carrying out deaerating.

The step of arranging first and second collar pieces may include, first, applying the flexible barrier to respective inward-boundaries of one or more plate-section, and then so arranging each of the plate-sections being employed, to produce a generally water-impermeable seal. The step of adjacently arranging at least two of the plate-sections may include arranging a third edge-boundary of a third of the plate-sections adjacent a first edge-boundary of each of a first and second of the plate-sections, the first plate-section having been oriented with its first inward-edge-boundary in a manner that creates an opening in the exterior perimeter of the plate; or the step of adjacently arranging at least two of the plate-sections may include (1) arranging a third edge-boundary of a third of the plate-sections adjacent a first edge-boundary of each of a first and second of the plate-sections, (2) arranging a fourth edge-boundary of a fourth of the plate-sections adjacent a second edge-boundary of each of the first and second plate-sections, whereby the first and second plate-sections are oriented with a respective first and second curved inward-boundary such that an aperture within the segmented plate is created.

BRIEF DESCRIPTION OF THE DRAWINGS

For purposes of illustrating the innovative nature plus the flexibility of design and versatility of the preferred plate structures and associated assembly technique, supported and disclosed hereby, the invention will be better appreciated by reviewing the accompanying drawings (in which like numerals, as included, designate like parts). One can appreciate the many features that distinguish the instant invention from known designs, such as the unitary deaerator top plate design in FIG. 1, and from traditional repair techniques. The drawings have been included to communicate features of the innovative structures and associated assembly technique of the invention as well as demonstrate the unique approach taken by the applicants by way of example, only, and are in no way intended to unduly limit the disclosure hereof.

FIG. 9 is a flow diagram depicting details of a process 200 for assembling a segmented plate within a confined area having a limited access, according to the invention. Illustrated are core, as well as further unique and distinguishing features, for utilizing technology represented throughout the figures to assemble segmented plates such as those represented and depicted in FIGS. 2A–2B, 3, 4A–4B, 5–6, 7A–7B, and 8A–8B.

DETAILED DESCRIPTION OF EMBODIMENTS DEPICTED IN DRAWINGS

In connection with the following more-detailed technical discussion of FIGS. 1–8, occasional reference will be made to the features depicted in the FIG. 9 flow diagram 200 which details core, as well as further unique and distinguishing features of a process for assembling a segmented plate within a confined area having a limited access, according to the invention.

Figure 1:
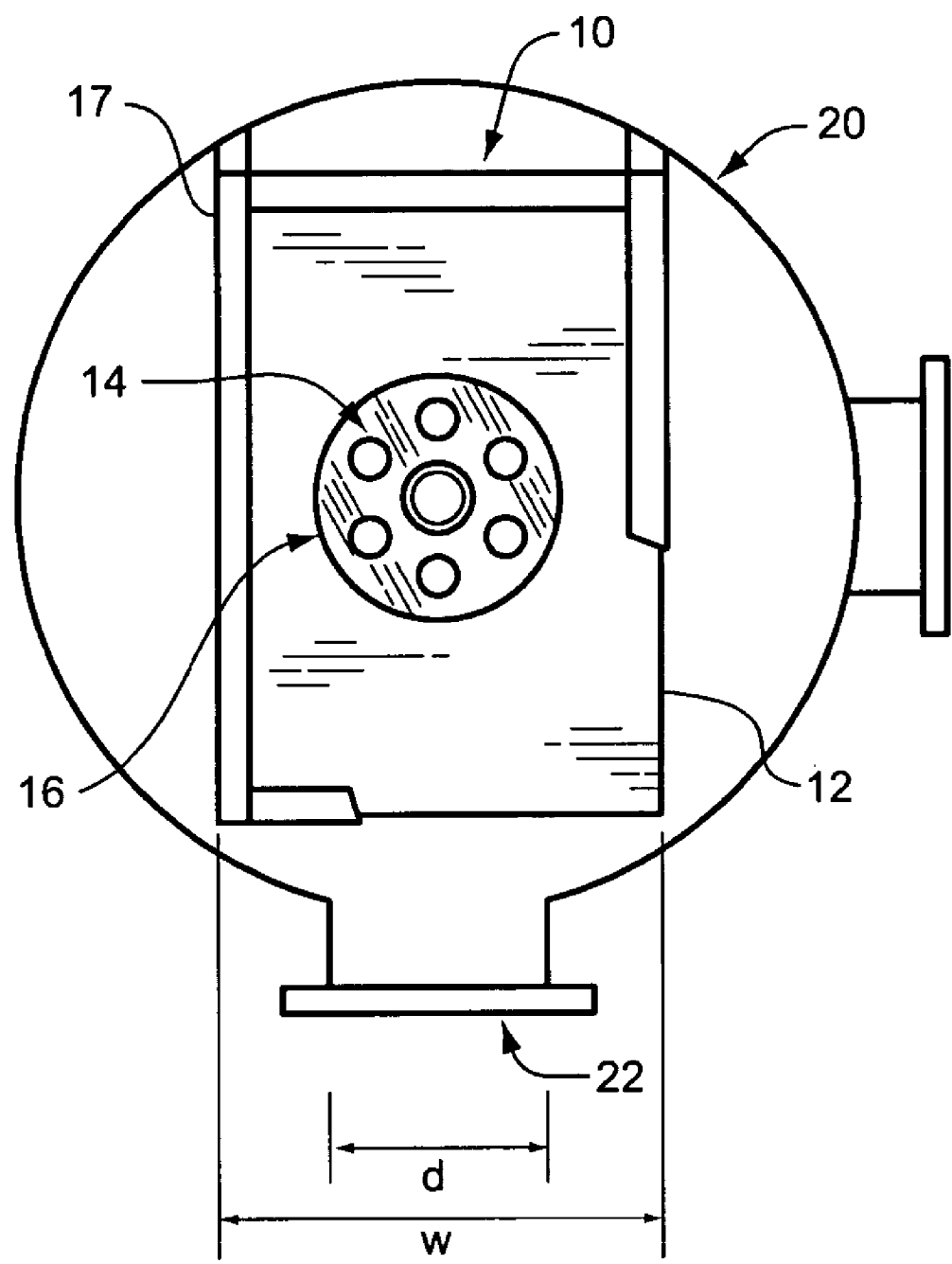
FIG. 1 is a top plan view depicting a known unitary tray enclosure top plate 10 of the type currently installed within the deaerator tank outlined at 20 having an access 22.
Figure 6:
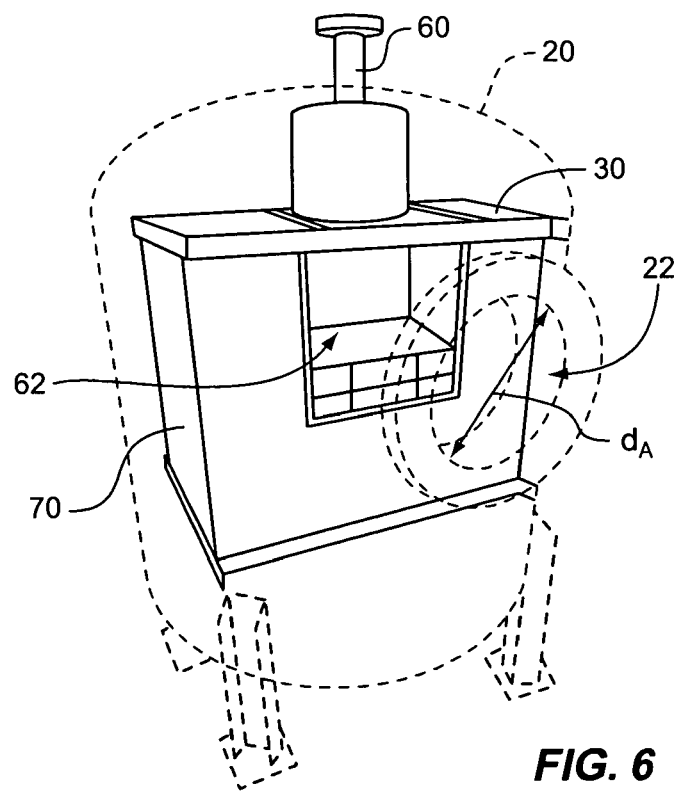
FIG. 6 is an isometric pictorial of a tray enclosure 70 of a deaerator tank 20 (in phantom and as depicted also in FIGS. 1 and 3, by way of example only), to which a segmented plate 30 (also depicted in FIGS. 2A and 3) has been assembled and secured according to the invention.

FIG. 1 is provided by way of background reference and depicts a known unitary tray enclosure top plate 10 of the type currently initially installed by the OEM, Sterling Deaerator Company, a subsidiary of AS-Tech Engineering Company in Cumming, Ga., within one of their deaerator tanks outlined at 20 (and as depicted, in phantom, in FIG. 6). Known top plate 10 has a rectangular outer perimeter, labeled 12 for reference, around which a support member 17 is positioned to assist in securing the plate 10 to the tray enclosure (not shown, as it is underneath the plate—for reference see FIG. 6 at 70). As one can appreciate, deaerator tank 20 has limited access 22 (diameter, d) making routine maintenance within the tank, difficult. In the event top plate assembly 10 (width, w, which one can see is greater than d) must be removed and/or replaced—see, also, box 202 in FIG. 9—to do so one must first cut-apart (by way of torching, sawing, etc.) and remove the plate 10 while preserving nozzle assembly 14 located within aperture 16.

Figure 2A:
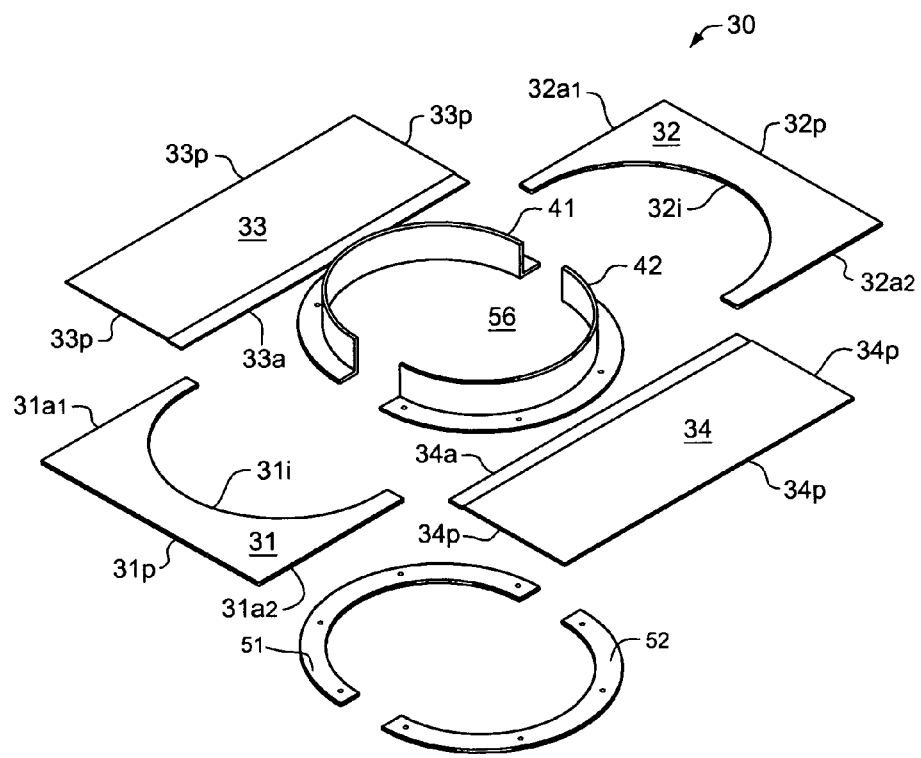
FIG. 2A is an isometric exploded assembly drawing depicting features of one embodiment of a preferred segmented plate 30 of the invention.
Figure 2B:
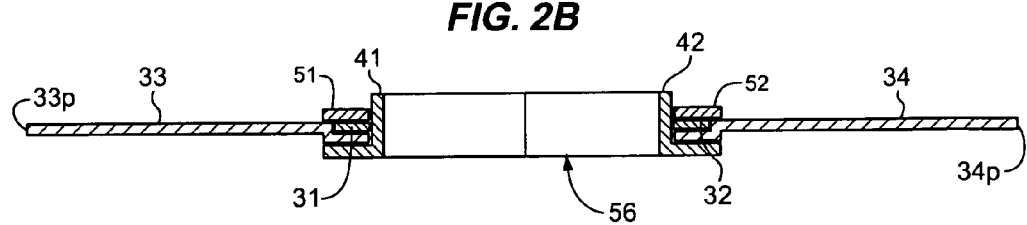
FIG. 2B is a sectional view taken along 2B—2B of FIG. 3, of the segmented plate 30, after having been assembled.
Figure 3:
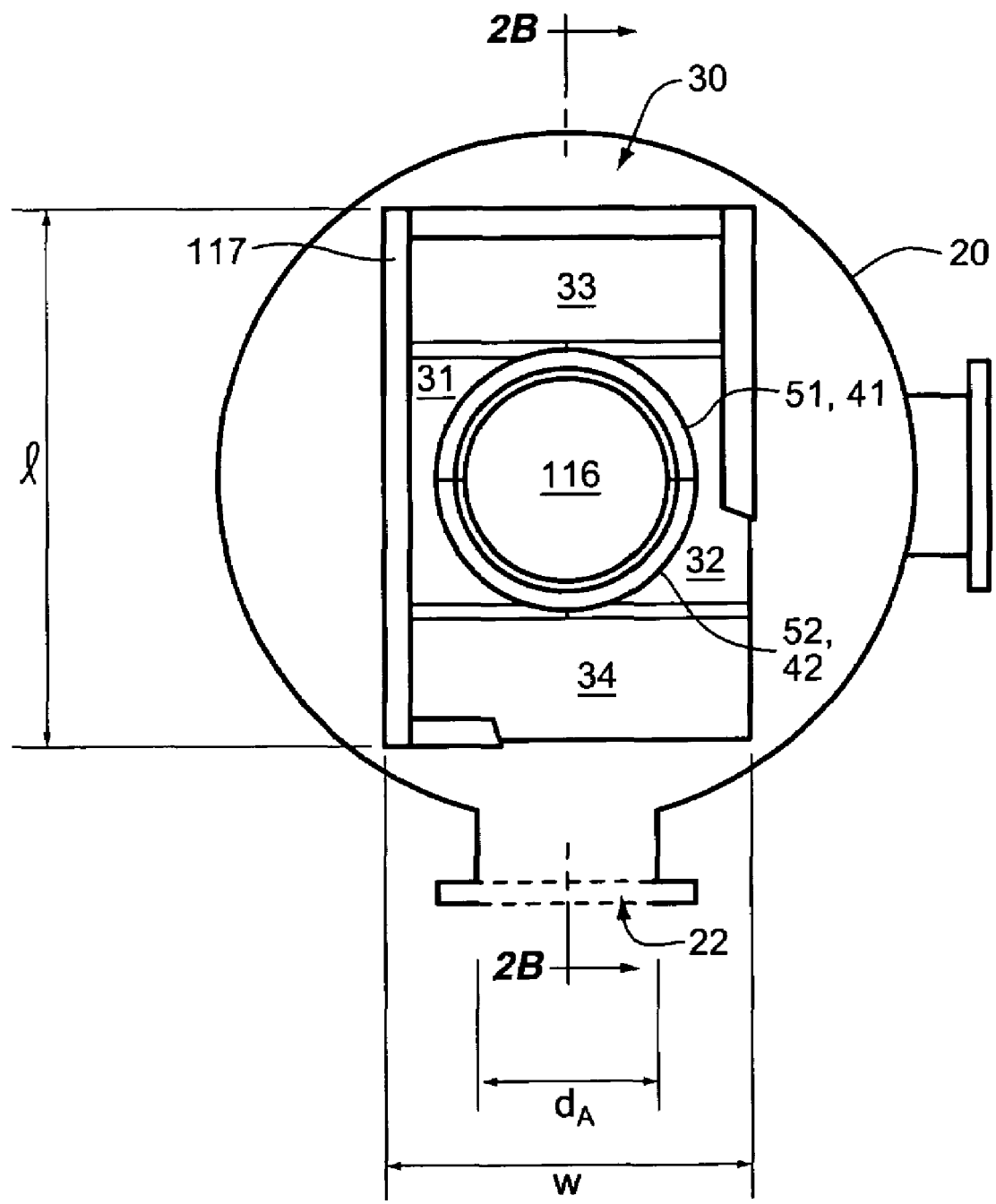
FIG. 3 is a top plan view depicting the segmented plate 30, also shown in FIG. 2A, of the invention having been assembled inside tank 20 according to the invention.

The exploded assembly drawing in FIG. 2A depicts features of a segmented plate 30 of the invention which may be used as a replacement for unitary plate 10. Shown are four plate-sections 31, 32, 33, 34, two collar pieces 41, 42, and two top supports 51, 52. One can better appreciate the process of assembling plate-sections and other pieces shown in FIG. 2A by referring also to the FIG. 3 top plan view and FIG. 2B sectional view. A segmented plate 30 (such as is shown in FIGS. 2B and 3) may be assembled as follows: once the plate-sections and other pieces have been passed through access $d_A$ and into the confined region/area in which the plate is to be assembled (FIG. 9, box 204), the segments may be assembled into a plate (FIG. 9, box 208) a variety of ways. For example, one can arrange a third edge-boundary 33a with a uniquely configured seam (for example, that shown as 333a in FIG. 7B) of plate-section 33 adjacent an edge-boundary ($31_{a1}$, $32_{a1}$) of each plate-section 31 and 32, and arrange a fourth edge-boundary 34a of plate-section 34 adjacent an edge-boundary ($31_{a2}$, $32_{a2}$) of each of the plate-sections 31 and 32. As can be better seen in FIG. 7B, preferably extending at least partially along adjacent edge-boundaries such as those labeled $331_{a1}$, $332_{a1}$, $331_{a2}$, $332_{a2}$ 333a, and 334a, is a self-lock seam. A self-lock seam configured in suitable fashion, such as the interlocking U-shaped seam in FIG. 7B, may be used in connection with the structures depicted in FIGS. 2A, 3, 4A–4B, 5, and of course, 7A to provide strength along adjacent plate-sections.

Figure 4A:
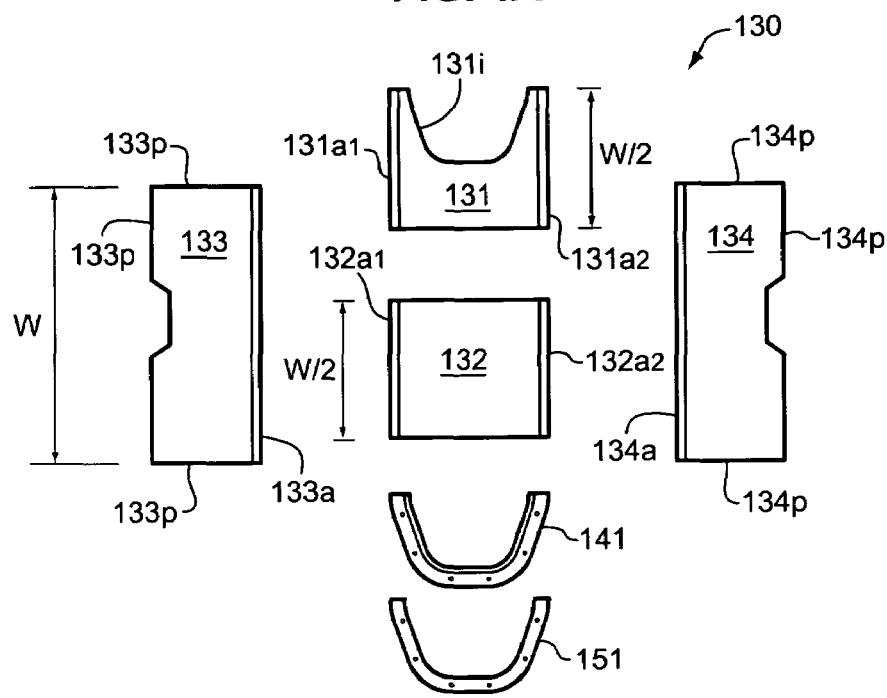
FIG. 4A is a top plan exploded assembly drawing representing an alternative segmented plate 130.
Figure 4B:
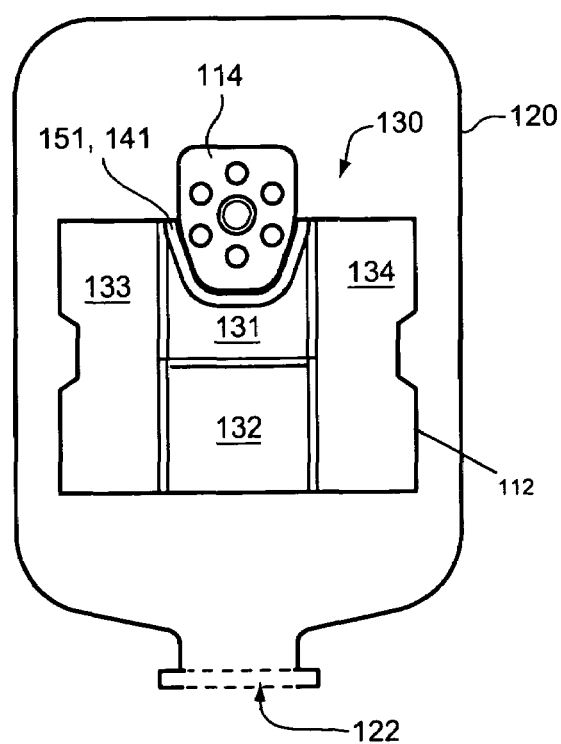
FIG. 4B is a top plan view depicting the plate 130 of FIG. 4A having been assembled with nozzle body/vent sub-assembly 114, inside tank 120.

Referring also to FIG. 9 (box 210), plate-sections 31, 32 may be oriented with a respective curved inward-boundary 31i, 32i such that an aperture 56 is created within the segmented plate; or the plate-sections may be oriented as alternatively depicted in FIGS. 4A and 4B, with a respective curved inward-boundary 131i of one of the plate sections, here 131, facing outwardly (FIG. 9, box 209) such that an opening is created in the plate's exterior perimeter. This alternative orientation and construction may be employed where the sub-assembly around which the segmented plate is to be assembled, is off-set from center (for example, that shown at 114 in FIG. 4B). After constructing the segmented plate 30 (see also, FIG. 9, box 212), the plate may be suitably secured (for example, utilizing a support structure shown at 117 in FIG. 3 and welding) to enclose a tray assembly (such as that labeled 62 in FIG. 6) adapted for use in carrying out deaerating.

Once again, FIG. 2B is a sectional view taken along 2B—2B of FIG. 3, of the segmented plate 30, after having been assembled. The configuration presented in FIG. 2B can be used if the geometric size of the nozzle body sub-assembly to fit within aperture 56 (such as that at 214 in FIG. 5) is sufficient to permit mechanical securing of the collar pieces 41, 42 to the nozzle body sub-assembly and if space within the confined area is large enough to allow an installer to solder around the top ring supports 51, 52. Otherwise the alternate assembly represented by FIGS. 7A, 8A–8B comprised of moon-shaped collar pieces 341, 342 and respective clamping ears 344, 345, 346, 347 along with respective moon-shaped supports 351, 352 and shims 354, 356, is preferred. FIG. 3 is a top plan view depicting the segmented plate 30, also shown in FIG. 2A, of the invention having been assembled inside tank 20 according to the invention. FIG. 4A is a top plan exploded assembly drawing representing an alternative segmented plate 130. FIG. 4B is a top plan view depicting the plate 130 of FIG. 4A having been assembled with nozzle body/vent sub-assembly 114, inside tank 120.

Next, referring collectively to FIGS. 2A, 4A–4B, 7A, 8A–8B, and 9 (especially the step-features lumped within boxes 208 and 240, which may be included 246 in the assembly process): Along with arranging respective edge-boundaries 33a, 34a, 133a, 134a, 333a, and 334a adjacent edge-boundaries $31_{a1}$, $32_{a1}$, $31_{a2}$, $32_{a2}$ and $131_{a1}$, $132_{a1}$, $131_{a2}$, $132_{a2}$ and $331_{a1}$, $332_{a1}$, $331_{a2}$, $332_{a2}$ of plate sections 31, 32 and 131, 132 and 331, 332 one or more respective collar pieces 41, 42, 141, and 341, 342 (box 242) and one or more top supports 51, 52, 151, and 351, 352 (box 244) may be arranged, in water-impermeable fashion, adjacent respective inward-boundaries 31i, 32i and 131i and further around the periphery of a centrally located sub-assembly (e.g., nozzle/vent assembly 14 in FIG. 1) or the periphery of an off-centered sub-assembly (e.g., nozzle/vent assembly 114 in FIG. 4B). As detailed in FIGS. 2B, 3, 4A–4B, 8A–8B, and 9 (box 248) one can appreciate that top support(s) 51, 52, 151, 351, and 352 may be suitably secured using any one or combination of mechanisms such as dowels 357, 358, bolts, screws, clamps and other fasteners, adhesives, etc., effecting a water-impermeable seam with a sub-assembly (such as 14 or 114). As can be seen by the FIG. 2B sectional view, and further unique to this embodiment as designed by applicants, sandwiched between collar pieces 41, 42 and respective top supports 51, 52 is: a portion of edge-boundary 33$a$ of plate-section 33, a portion of edge-boundary 34$a$ of plate-section 34, a portion of edge-boundaries 31$_{a1}$ and 32$_{a1}$ of respective plate-sections 31, 32, a portion of curved inward-boundary 31$i$ of plate-section 31, and a portion of curved inward-boundary 32$i$ of plate-section 32.

Figure 5:
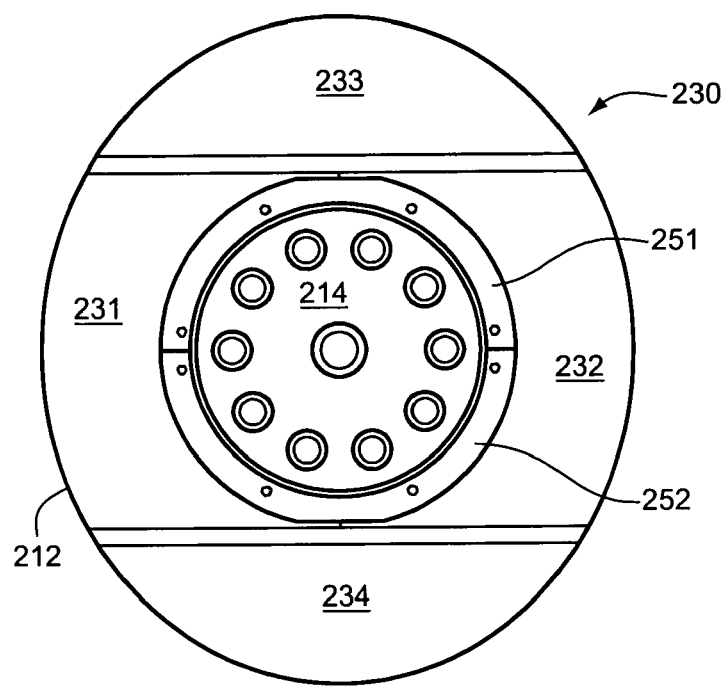
FIG. 5 is a top plan of an assembled segmented plate 230 having an oval shaped exterior perimeter, by way of example only, and is shown assembled around a nozzle body/vent sub-assembly 214.
Figure 7A:
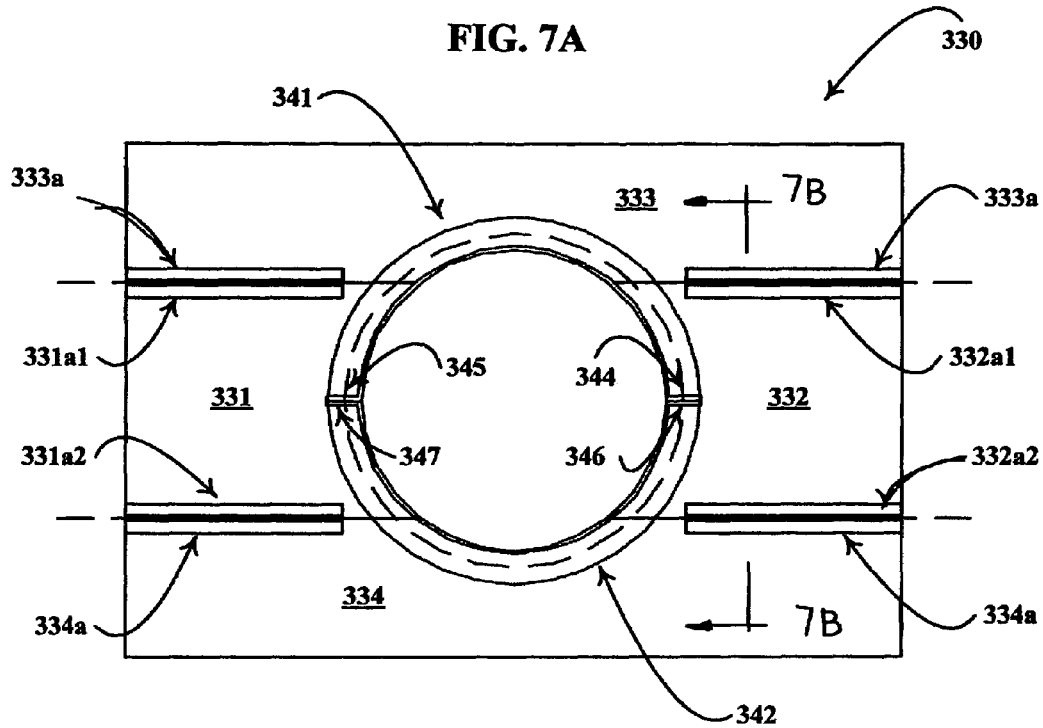
FIG. 7A is a top plan view depicting yet another segmented plate 330 embodiment of the invention having been assembled with an alternative collar pieces 341, 342 (with alternative top supports therebeneath).
Figure 7B:
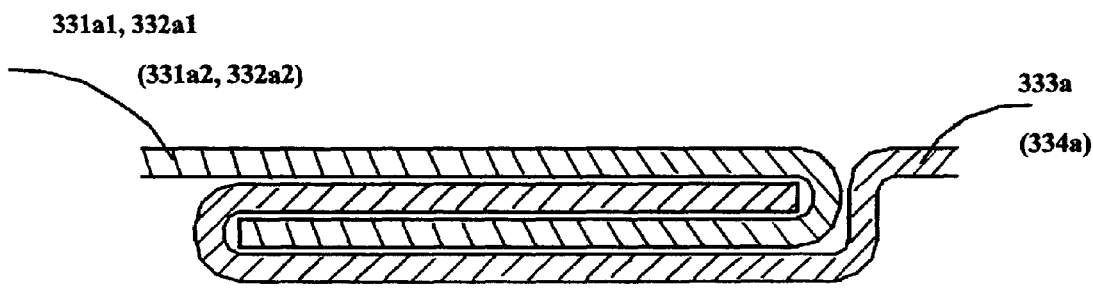
FIG. 7B is an enlarged sectional taken along 7B—7B of FIG. 7A depicting the self-lock seam along adjacent edge-boundaries of plate-sections shown in FIG. 7A.

The segmented plate 30 in FIGS. 2A–2B and 3 and plate 330 in FIG. 7A are shown with a rectangular exterior perimeter (length l and width w) made up of outwardly facing segments 31$p$, 32$p$, 33$p$, 34$p$. Alternatively, segmented plate 130 of FIGS. 4A–4B has an irregular shape 112 comprised of outwardly facing segments 131$i$, 132$p$, 133$p$, 134$p$. The exterior perimeter of the segmented plate of the invention is preferably shaped to accommodate an enclosure, or other component, with which the segmented plate will operate: Thus, as one can appreciate, the exterior perimeter may be polygonal in shape (rectangular, triangular, square, or any other closed shape), oval (as shown in FIG. 5, labeled 212), circular, or some type of an irregular shape such as is shown in FIG. 4B, labeled 112. The confined area 120 within which segmented plate 130 has been assembled, after the plate-sections and various pieces have been passed through access 122 (FIG. 4B), has plate-sections 131, 132, 133, 134 arranged adjacently as well as collar 141 beneath a top support 151 arranged around the periphery of an irregularly shaped nozzle and vent sub-assembly 114.

The alternative assembled segmented plate 230 in FIG. 5 has plate-sections 231, 232, 233, 234 adjacently arranged into a plate with an oval shaped exterior perimeter 212, by way of example only, and is assembled around a sub-assembly 214—similar to that of FIG. 1 labeled 14—that has several spray nozzles (outer circles) surrounding a vent passage (in the center). Top supports 251 and 252 have been arranged (FIG. 7, box 244) and bolted, riveted, nailed, or otherwise adhered and secured around the sub-assembly 214.

FIG. 6 is an isometric pictorial of a tray enclosure 70 of a deaerator tank 20 (in phantom and as depicted also in FIGS. 1 and 3, by way of example only), to which a segmented plate, for example, either that labeled 30 (see, also, FIGS. 2A and 3) or that labeled 330 in FIG. 7A, has been assembled and secured to the enclosure 70, according to the invention. As is shown in FIGS. 1 and 3, it is through access, d$_A$ (shown in phantom) that the plate-sections and other pieces must pass so that a segmented plate may be built within the confined region/area of tank 20. The instant unique design provides an alternative, more convenient solution to the fabrication of new tray enclosure top plates, as well as the maintenance/replacement of damaged tray enclosure top plates (e.g., as in FIG. 1 at 10)—thus, making the deaerator tank design much more useful and valuable for long-term operation, in general.

Figure 8A:
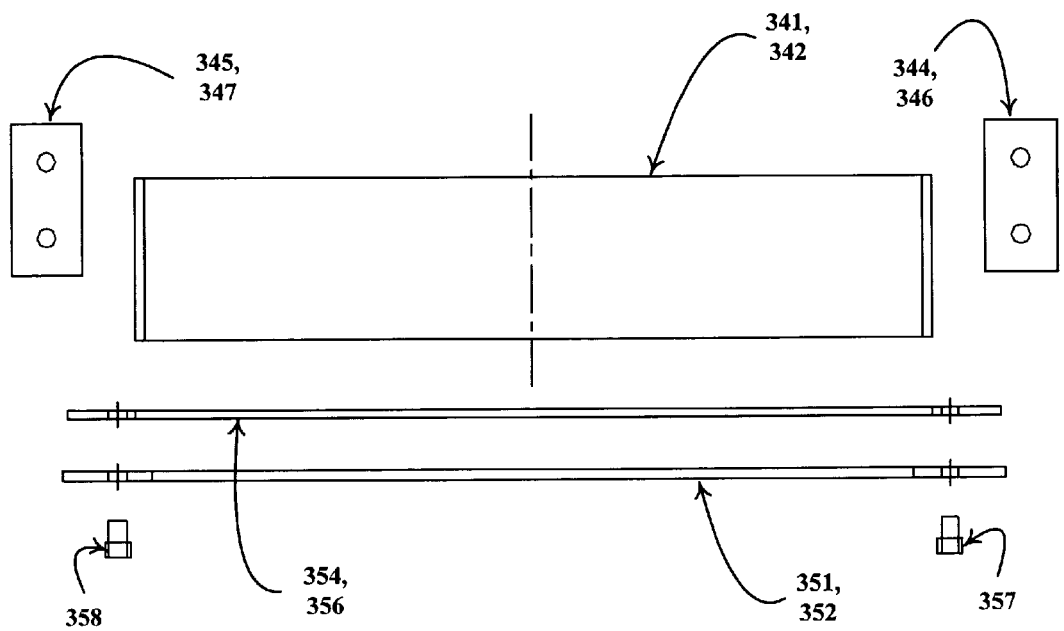
FIG. 8A is an exploded side plan view of the collar pieces 341, 342 of FIG. 7A as well as associated top supports 351, 352.
Figure 8B:
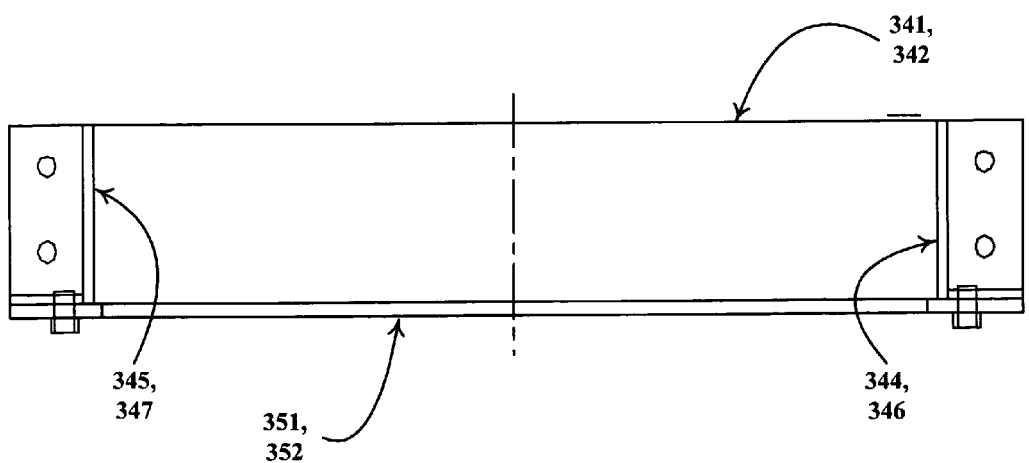
FIG. 8B depicts an assembled collar piece(s) and top support(s) of FIG. 8A.

FIG. 7A is a top plan view depicting yet another segmented plate 330 embodiment of the invention having been assembled with an alternative collar pieces 341, 342 (with alternative top supports therebeneath—as shown in FIG. 8A–8B). The plate 330 has plate-sections 331, 334, 333, 334 adjacently arranged. Extending along respective adjacent edge-boundaries is a seam, such as the U-shaped configuration depicted, as enlarged, in FIG. 7B. As referenced in FIG. 9, box 206, the self-lock seam of FIG. 7B may be constructed by way of suitably bending the initially planar edge-boundaries of respective plate-sections. As one can appreciate, known techniques and tooling will be applied, depending upon the material selected for plate-sections, to bend, machine, cut, etc., the metal or alloy sheeting used (e.g., $\frac{1}{32}$-inch stainless) to produce a desired seam configuration. The self-lock seam preferably is configured to benefit from material expansion experienced when temperature and/or pressure increases within the confined area (e.g., FIG. 6 at 62) during normal operation, such as that experienced during deaerating boiler water: As plate-sections and respective edge-boundaries expand, a point is reached where a seam is supported along the material edge in a 'self-lock' manner.

FIG. 8A is an exploded side plan view of the collar pieces 341, 342 of FIG. 7A as well as associated top supports 351, 352. FIG. 8B depicts an assembled collar piece(s) and top support(s) of FIG. 8A. Respective clamping ears 344, 345, 346, 347 are preferably mechanically fastened by way of bolts, screws, rivets, welding, and so on, to position each collar piece(s) adjacent and around the periphery of a nozzle sub-assembly (14, 114, 214) for permanent bonding of the plate assembly 330 to the sub-assembly (e.g., by welding).

Once again, and as referenced throughout, the unique features depicted in FIG. 9, in flow diagram format, detail a process 200 for assembling a segmented plate within a confined area having a limited access, according to the invention. Illustrated are core, as well as further unique and distinguishing features, for utilizing technology represented throughout the figures to assemble segmented plate structures such as those represented and depicted in FIGS. 2A–2B, 3, 4A–4B, 5–6, 7A–7B, and 8A–8B. As mentioned, the flexible barrier may be made of a material having resiliency and adapted to produce a generally water-impermeable seal, selected from the group consisting of a gasket tape, a joint sealant, a plastic adhesive, a caulking compound, weather stripping, and a high temperature sealant. Preferably the barrier material is resilient to thermal fluctuations to which the segmented plate will be exposed in operation; selection of a thermally resistant material provides longevity to the seal such that it will not degrade to the point it is no longer effective. A wide variety of resilient barrier materials are currently available. The flexible barrier may be applied prior to arranging plate sections and pieces (boxes 208 and 240), or during the process of arranging plate-sections and pieces (boxes 208 and 240) by applying the barrier material to any one or more of the respective perimeter(s), the periphery of the nozzle sub-assembly, collar pieces, and edge-boundaries of various sections (boxes 211, 242, 244). By way of example only, a few of the several companies that provide barrier materials include: GoreTex® brand joint sealant made by W. L. Gore & Associates, and TFCO brand expanded PTFE joint sealant made by TFCO, Inc.

While certain representative embodiments and details have been shown for the purpose of illustrating the invention, those skilled in the art will readily appreciate that various modifications, whether specifically or expressly identified herein, may be made to any of the representative embodiments without departing from the novel teachings or scope of this technical disclosure. Accordingly, all such modifications are contemplated and intended to be included within the scope of the claims. Although the commonly employed preamble phrase "comprising the steps of" may be used herein in a method claim, applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A segmented plate adapted for assembly within a confined area of a deaerator tank having a limited access thereto, comprising:
    (a) the plate, as assembled within the confined area of the deaerator tank, having
        an exterior perimeter,
        an aperture having an inner perimeter,
        a plurality of generally rigid plate-sections comprising a first, second, and third plate-section, and
        extending at least partially along adjacent boundaries of said plate-sections having been adjacently arranged, is a self-lock seam;
    (b) each of said plate-sections sized smaller than the access to permit passage therethrough for the assembly; and
    (c) said adjacent boundaries comprise a third edge-boundary of said third plate-section adjacent a first edge-boundary of each of said first and second plate-sections.

2. The segmented plate of claim 1, having been assembled within the confined area having the limited access, and wherein:
    (a) said inner perimeter comprises an inward-boundary of at least each of said first and second plate-sections;
    (b) a fourth plate-section of said plurality of plate-sections comprises a fourth edge-boundary; and
    (c) said adjacent boundaries further comprise
        said fourth edge-boundary adjacent a second edge-boundary of each of said first and second plate-sections.

3. The segmented plate of claim 1, having been assembled within the confined area having the limited access, and wherein:
    (a) said inner perimeter comprises a first curved inward-boundary of said first plate-section and a second curved inward-boundary of said second plate-section;
    (b) first and second collar pieces are arranged, in water-impermeable fashion, adjacent said first and second curved inward-boundaries; and
    (c) said first and second collar pieces are further arranged around a periphery of a central sub-assembly.

4. The segmented plate of claim 3 wherein:
    (a) the confined area comprises a chamber of the deaerator tank and the assembled segmented plate is secured to enclose a tray assembly;
    (b) said periphery of said central sub-assembly is generally circular and said central sub-assembly comprises a spray nozzle; and
    (c) first and second top supports are arranged around said periphery and around said first and second collar pieces.

5. The segmented plate of claim 4 wherein:
    (a) a fourth plate-section of said plurality of plate-sections comprises a fourth edge-boundary;
    (b) said adjacent boundaries further comprise
        said fourth edge-boundary adjacent a second edge-boundary of each of said first and second plate-sections; and
    (c) sandwiched between said first collar piece and said first top support are: a portion of said third edge-boundary, a portion of each of said adjacent first edge-boundaries of said first and second plate-sections, a portion of said first curved inward-boundary, and a portion of said second curved inward-boundary.

6. The segmented plate of claim 1, having been assembled within the confined area having the limited access, and wherein:
    (a) said aperture comprises an opening in said exterior perimeter such that a portion of said exterior perimeter is common with said inner perimeter;
    (b) said inner perimeter comprises an inward-boundary of said first plate-section;
    (c) a first collar piece is arranged, in water-impermeable fashion, adjacent said inward-boundary; and
    (d) said first collar piece is further arranged around at least a portion of a periphery of a sub-assembly having a vent passage therethrough.

7. The segmented plate of claim 6 wherein:
    (a) the confined area comprises a chamber of the deaerator tank;
    (b) a fourth plate-section of said plurality of plate-sections comprises a fourth edge-boundary; and
    (c) said adjacent boundaries further comprise
        said fourth edge-boundary adjacent a second edge-boundary of each of said first and second plate-sections.

8. A segmented plate adapted for assembly within a confined area, comprising:
    (a) the plate, as assembled, having
        an exterior perimeter,
        an aperture having an inner perimeter,
        a plurality of generally rigid plate-sections, and
        extending at least partially along adjacent boundaries of said plate-sections having been adjacently arranged, is a self-lock seam;
    (b) the confined area comprises a chamber of a deaerator tank;
    (c) said self-lock seam comprises an interlocking of an U-shaped edge of each said plate-section adjacently arranged;
    (d) said generally rigid plate-sections are made of a material thermally expandable upon exposure to a range of temperatures to which the confined area may be exposed; and
    (e) a flexible barrier, made of a material having resiliency and adapted to produce a generally water-impermeable seal, selected from the group consisting of a gasket tape, a joint sealant, a plastic adhesive, a caulking compound, weather stripping, and a high temperature sealant, is interposed between said inner perimeter and at least a portion of a periphery of a sub-assembly having a spray nozzle.

9. The segmented plate of claim 8 wherein:
    (a) said inner perimeter comprises a first inward-boundary of a first plate-section of said plurality of plate-sections;
    (b) said first inward-boundary is arranged, in water-impermeable fashion, adjacent said periphery of said sub-assembly; and
    (c) said material for said generally rigid plate-sections is selected from the group consisting of a metal, an alloy, and a ceramic.

10. A segmented plate assembled within a chamber of a deaerator tank having a limited access thereto, comprising:
(a) the plate, as assembled within the chamber and secured to enclose a tray assembly, having
an exterior perimeter,
a plurality of generally rigid plate-sections comprising a first second, and third plate-section, and
extending at least partially along adjacent boundaries of said plate-sections having been adjacently arranged, is a self-lock seam; and
(b) each of said plate-sections sized smaller than the access to permit passage therethrough for the assembly; and
(c) said adjacent boundaries comprise a third edge-boundary of said third plate-section adjacent a first edge-boundary of each of said first and second plate-sections.

11. The segmented plate of claim 10, further comprising:
(a) an aperture having an inner perimeter comprising a first inward-boundary of said first plate-section;
(b) a first collar piece arranged, in water-impermeable fashion, adjacent said first inward-boundary; and
(c) said first collar piece is further arranged around a periphery of a sub-assembly having a vent passage therethrough.

12. The segmented plate of claim 11 wherein:
(a) said inner perimeter further compnses a second inward-boundary of said second plate-section;
(b) a second collar piece is arranged, in water-impermeable fashion, adjacent said second inward-boundary;
(c) said second collar piece is further arranged around said periphery of said sub-assembly; and
(d) said sub-assembly further comprises a spray nozzle.

13. A segmented plate having been assembled, within a chamber of a deaerator tank, comprising:
(a) the plate, as assembled, having
an exterior perimeter,
a plurality of generally rigid plate-sections, and
extending at least partially along adjacent boundaries of said plate-sections having been adjacently arranged, is a self-lock seam;
(b) said exterior perimeter is of a final geometric size larger than may pass through the limited access;
(c) said self-lock seam comprises an interlocking of an U-shaped edge of each said plate-section adjacently arranged;
(d) said exterior perimeter is of a shape selected from the group consisting of an oval, a circle, a polygon, and an irregular shape; and
(e) a flexible barrier, made of a material having resiliency and adapted to produce a generally water-impermeable seal, selected from the group consisting of a gasket tape, a joint sealant, a plastic adhesive, a caulking compound, weather stripping, and a high temperature sealant is interposed between said exterior perimeter and a tray enclosure.

14. The segmented plate of claim 13:
(a) further comprising an aperture having an inner perimeter comprising an inward-boundary of each of a first and second plate-section of said plurality of plate-sections, said inner perimeter is of a shape selected from the group consisting of an oval, a circle, a polygon, and an irregular shape;
(b) a third and fourth plate-section of said plurality of plate-sections each comprise a respective third and fourth edge-boundary; and
(c) said adjacent boundaries comprise
said third edge-boundary adjacent a first edge-boundary of each of said first and second plate-sections, and
said fourth edge-boundary adjacent a second edge-boundary of each of said first and second plate-sections.

15. A process for assembling a segmented plate within a confined area of a deaerator tank having a limited access thereto, comprising:
(a) passing each of a plurality of generally rigid plate-sections through the limited access of the confined area of the deaerator tank;
(b) adjacently arranging at least a first second, and third plate section of said plurality of plate-sections, by interlocking a U-shaped edge of said plate-sections generally along adjacent boundaries thereof, said step of adjacently arranging to comprise arranging a third edge-boundary of said third plate-section adjacent a first edge-boundary of each of said first and second plate-sections; and
(c) so assembling the segmented plate whereby a final geometric size of an exterior perimeter thereof is larger than may pass through the limited access.

16. The process of claim 15:
(a) wherein said step of adjacently arranging further comprises
arranging a fourth edge-boundary of a fourth plate section of said plurality of plate-sections adjacent a second edge-boundary of each of said first and second plate-sections; and
(b) further comprising the step of arranging first and second collar pieces, in water-impermeable fashion, adjacent a respective first and second inward-boundary of each said first and second plate-sections.

17. The process of claim 16 further comprising the steps of:
(a) arranging said collar pieces, each of which comprises a curvature, around a periphery of a central sub-assembly having a spray nozzle therethrough;
(b) arranging first and second top supports around said periphery of said central sub-assembly sandwiching a portion of said first and second inward-boundaries of each said first and second plate-sections between said first and second top supports and said first and second collar pieces; and
(c) securing said first and second top supports, effecting a water-impermeable seam.

18. The process of claim 16:
(a) wherein the confined area comprises a chamber of the deaerator tank; and said step of arranging first and second collar pieces further comprises, first, applying a flexible barrier made of a material selected from the group consisting of a gasket tape, a joint sealant, a plastic adhesive, a caulking compound, weather stripping, and a high temperature sealant, to said respective inward-boundaries, and then so arranging said collar pieces to produce a generally water-impermeable seal; and
(b) further comprising the step of securing the assembled sectioned plate to enclose a tray assembly adapted for use in carrying out deaerating.

19. The process of claim 15:
(a) wherein said step of adjacently arranging further comprises arranging said first plate-section oriented with a first inward-edge-boundary creating an opening in said exterior perimeter, and (b) further comprising the steps of arranging a collar piece adjacent said first inward-edge-boundary and around at least a portion of a periphery of a sub-assembly having a spray nozzle.

20. The process of claim 15:
   (a) wherein said step of adjacently arranging further comprises
       arranging a fourth edge-boundary of a fourth plate section of said plurality of plate-sections adjacent a second edge-boundary of each of said first and second plate-sections, and
       said first and second plate-sections oriented with a respective first and second curved inward-boundary creating an aperture within the segmented plate; and
   (b) further comprising the step of sandwiching, between a first collar piece and a first top support, a portion of said third edge-boundary, a portion of said first curved inward-boundary, and a portion of said second curved inward-boundary.

21. A segmented plate adapted for assembly within a confined area of a deaerator tank having a limited access thereto, comprising:
   (a) the plate, as assembled within the confined area of the deaerator tank, having an exterior perimeter, an aperture having an inner perimeter, a plurality of generally rigid plate-sections comprising a first, second, third, and fourth plate-section and interposed between and along adjacent boundaries of said plate-sections having been adjacently arranged is a flexible barrier and,
   (b) each of said plate-sections sized smaller than the access to permit passage therethrough for the assembly; and
   (c) said adjacent boundaries comprise a third edge-boundary of said third plate-section adjacent a first edge-boundary of each of said first and second plate-sections and a fourth edge-boundary of said fourth plate-section adjacent a second edge-boundary of each of said first and second plate-sections.

22. The segmented plate of claim 21 wherein:
   (a) the confined area comprises a chamber of a deaerator tank;
   (b) said flexible barrier is made of a material having resiliency and adapted to produce a generally water-impermeable seal, selected from the group consisting of a gasket tape, a joint sealant, a plastic adhesive, a caulking compound, weather stripping, and a high temperature sealant.

* * * * *